May 12, 1970   W. O. ECKHARDT ETAL   3,511,580
LIQUID METAL COLUMN INTERFACE POSITION DETECTOR
Filed Nov. 30, 1967

Wilfried O. Eckhardt,
Harry J. King,
Joe M. Simpkins,
INVENTORS.
BY.

ALLEN A. DICKE, Jr.,
AGENT.

United States Patent Office 3,511,580
Patented May 12, 1970

3,511,580
LIQUID METAL COLUMN INTERFACE
POSITION DETECTOR
Wilfried O. Eckhardt, Malibu, Harry J. King, Canoga Park, and Joe M. Simpkins, Newbury Park, Calif., assignors to Hughes Aircraft Company, Culver City, Calif., a corporation of Delaware
Filed Nov. 30, 1967, Ser. No. 687,022
Int. Cl. B01k 3/00; F04b 19/00
U.S. Cl. 417—48                                  9 Claims

ABSTRACT OF THE DISCLOSURE

The position of a liquid metal interface in a column along a feedline is detected by placing an induction coil at the column and detecting the change in coil impedance as the liquid metal interface moves past the coil. This position information is used to control liquid metal supply means so that the liquid metal interface always lies within detection range of the coil.

BACKGROUND

This invention is directed to a liquid metal column interface position detector, and particularly to a detector which employs inductive effect to establish the presence of the interface between a liquid metal and another material.

The detection of the interface position of two materials in a feedline is sometimes necessary to energize signaling or control equipment. In many cases, such detection is easily managed by the immersion of sensing electrodes. These necessarily imply the passage of an electric current therebetween to signal the position of the liquid interface with respect to the electrodes. Such is quite satisfactory in a number of different kinds of situations. However, when liquid metal is being monitored, quite often the liquid metal is participating in an electric effect so that it is at a particular potential or has current passing therethrough. Such interferes with immersed electrode position detecting. Furthermore, on occasion the liquid being monitored is of corrosive or is otherwise difficult in character so that the immersion of electrodes therein becomes difficult. Thus, immersed electrodes are not always desirable in interface position detecting in liquids. In other cases floats are used to detect interface position. However, floats imply mechanical motion, which in turn is difficult to signal from the interior to the exterior of the vessel of feedline in which the interface is detected.

Other methods are also used. Capacitive and optical effects are sometimes used. Capacitive effects are only useful when there is a fairly large dielectric difference between the two materials on the opposite sides of the interface. Furthermore, the measurement of capacitive difference becomes more difficult as the distance between the capacitor plates becomes greater. Again, this requires that the vessel in which the interface is to be detected be fairly thin. The difficulty with optical devices, of course, lies in the requirement that the vessel or feedline in which the interface is positioned be fairly transparent, and that the material on one side of the interface be fairly transparent while the material on the other side is fairly opaque. These requirements are not often met.

SUMMARY

In summary, this invention is directed to a detector for detecting the position of a liquid metal interface in a feedline. Detection is accomplished by means of an induction coil, which forms a part of a tank circuit. The tank circuit resonates at a frequency which is a function of the position of the liquid metal with respect to the coil. In order to provide a sharply defined reference frequency, a frequency determining crystal is used in association with the tank circuit. Deviation of the tank circuit resonance from the reference frequency produces an electric signal, which is used to control the interface position within the feedline.

Accordingly, it is an object of this invention to provide inductive means for detecting the position of a liquid metal interface in a feedline, and to use the detection to control the position of the interface within the feedline. It is a further object to provide an induction coil with respect to a liquid metal containing feedline and to provide an electric circuit which includes the induction coil and which oscillates with an amplitude which is a function of the position of the liquid metal interface with respect to the coil, so that rectification of the oscillation provides a signal which corresponds to liquid metal interface position. It is a further object to detect the interface position between an electrolyte and a liquid metal, preferably mercury, in a feedline and to control the interface position from the interface position signal. Other advantages and objects of this invention will become apparent from a study of the following portion of this specification, the claims and the attached drawings.

DESCRIPTION

Figure 1:
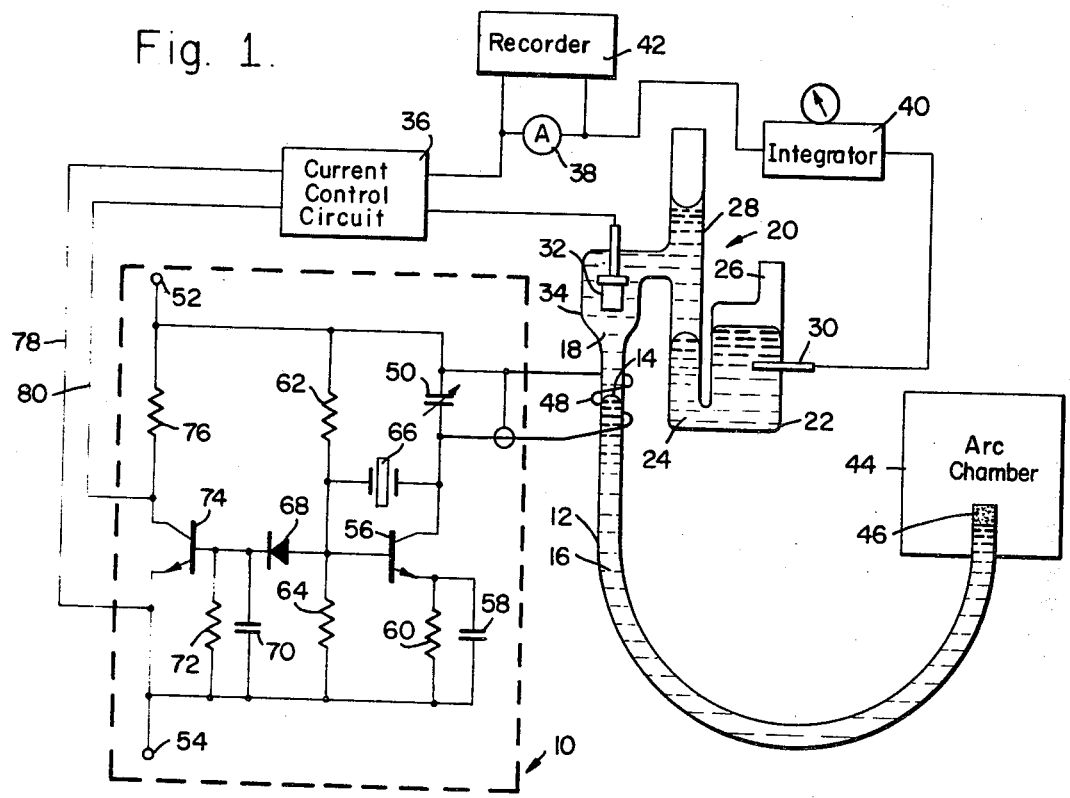
FIG. 1 is a sectional view of a mercury feed and utilization system and a schematic diagram of the electrical liquid metal interface detection system for detecting the interface position of the liquid metal.

Referring to the drawings, the preferred embodiment of the liquid metal column interface position detector is generally indicated at 10. Detector 10 is employed in conjunction with feedline 12 in which interface 14 is located between liquid metal column 16 and another material 18. In the illustrated case, liquid metal column 16 is mercury and material 18 is a mercury-plating electrolyte.

Liquid metal flow control and measuring is accomplished by liquid metal feed system 20. Liquid metal feed system 20 is fully described in patent application Ser. No. 687,004 entitled "Liquid Mercury Flow Control and Measuring System," filed Nov. 30, 1967 by Wilfried O. Eckhardt, the entire disclosure of which is incorporated herein by this reference. Liquid metal feed system 20 comprises vessel 22 which serves as a source of liquid metal to be fed. Vessel 22 contains liquid metal 24 which has an interface with the atmosphere through filler opening 26. The bottom of vessel 22 is open to electrolysis leg 28 which contains electrolyte 18 and which is also open at the top. If desired, the top of electrolysis leg 28 and the filler opening 26 can be connected to another common source of pressure, or can be individually connected to different pressure sources.

Electrode 30 is positioned in the liquid metal 24 in vessel 22 while electrode 32 is positioned in electrolyte 18 in chamber 34. When current is passed between the electrodes, liquid metal is plated from liquid metal 24 and plates out upon electrode 32. Electrode 32 has an insulated top and insulated lead and is preferably made of carbon so that plated out mercury does not adhere thereto but falls down from chamber 34 into feedline 12 to join the liquid metal column below interface 14. In this manner the liquid metal is transported from vessel 22 to feedline 12 below interface 14.

Electrolysis current is provided by electrolysis current control circuit 36, which is a conventional regulatable DC supply. Current control circuit 36 is directly connected to electrode 32, and is connected to electrode 30 through ammeter 38 and integrator 40. Ammeter 38 indicates the rate of liquid metal plating, and thus transfer, while recorder 42 paralleled thereacross records this information. Integrator 40 is in the form of an ampere-hour meter, or the like, and thus serves to show the total amount transported.

Liquid metal feed system 20 feeds liquid metal 16 to arc chamber 44. Arc chamber 44 contains liquid metal arc cathode 46, such as is disclosed in Pat. No. 3,475,636 granted Oct. 28, 1969 to W. O. Eckhardt entitled "Liquid-Metal Arc Cathode with Maximized Electron/Atom Emission Ratio." The nature of liquid metal arc cathode 46 is such that a very small liquid metal pool is provided for arcing, in order to minimize evaporation of liquid metal atoms and thus maximize the electron to atom emission ratio. In order to maintain the proper pool size, to prevent the pool from getting too large with resultant excessive evaporation, or getting too small with resultant arc starvation, the liquid metal feed system 20 provides the correct amount of liquid metal. This in turn is accomplished by maintaining the interface 14 at the correct level above the discharge point of liquid metal arc cathode 46. The height of interface 14 above the outlet of liquid metal arc cathode 46, plus the height of electrolyte 18 above interface 14, plus the absolute pressure on the top of electrolysis leg 28, minus the pressure in arc chamber 44 determines the pressure of the liquid metal feed to the arc cathode. For those cases where a constant head is desired, such an arrangement is eminently suitable.

The positioning of interface 14, and its maintenance in position, is accomplished by the detector system 10 and its control of the current control circuit 36.

Position detection is accomplished by induction coil 48 which is positioned around feedline 12 at the desired point of interface 14. Induction coil 48 forms part of a resonant LC circuit, which includes capacitor 50. Power is supplied to the detector circuitry with a positive DC connection at terminal 52 and a connection at terminal 54 which is negative with respect to terminal 52. The power can be supplied by any convenient and conventional power supply source. Terminal 52 is connected through the LC circuit comprised of coil 48 and capacitor 50 to the collector of transistor 56. The emitter of transistor 56 is connected through paralleled capacitor 58 and resistor 60 to terminal 54.

The base of transistor 56 is biased by resistors 62 and 64. Crystal 66 is connected between the collector and base of the transistor. These components form a crystal controlled oscillator in which inductance coil 48 and capacitor 50 form the tank circuit and crystal 66 serves as a frequency responsive coupler between collector and base so that the crystal controlled oscillator oscillates only at the band pass of the crystal.

The base of transistor 56 is connected through rectifying diode 68 and the rectified output is smoothed by capacitor 70. Resistor 72 provides base bias. The rectified output is connected to the base of transistor 74. Transistor 74 has its collector connected through resistor 76 to terminal 52 and has its emitter connected to terminal 54. Signal output lines 78 and 80 are respectively connected to terminal 54 and to the collector of transistor 74. Signal lines 78 and 80 are connected to current control circuit 36.

In operation, the inductive capacitive tank circuit of coil 48 and capacitance 50 is adjusted to resonate at the frequency of crystal 66 at the proper position of interface 14. In the particular circuit illustrated, an appropriate resonant frequency is in the order of 27 megacycles per second. Adjustment of the tank circuit can be arranged either for a low position of the interface 14 within coil 48, or a high position, depending on whether the signal fed into controller 36 is intended to increase or decrease with increasing electrolysis current demand. In the example given below, interface 14 is assumed to be high within coil 48, when resonance occurs, so that a decrease of the oscillation amplitude will signal to the current control circuit 36 the requirement for more electrolysis current.

As noted above, the oscillator could be tuned to operate in the opposite manner so that as the interface 14 dropped to a point where more electrolysis current is desired, the circuit would pass a signal into the current control circuit 36 to cause it to pass more electrolysis current.

Figure 2:
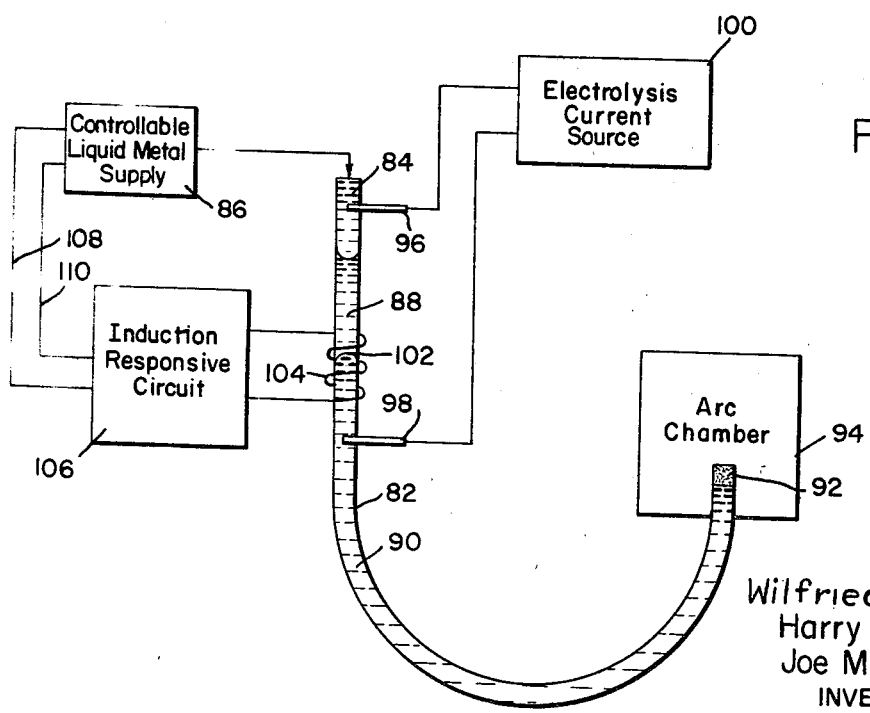
FIG. 2 is a similar sectional-schematic view of means for detecting the liquid metal interface with an electrolyte in a feedline, with a different means for supplying liquid metal to the feedline.

The above description describes the manner in which the liquid metal column interface position detector detects the interface in a liquid metal feed system wherein a constant head is desired. However, in some cases it is desirable to provide a flow of liquid metal which is independent of pressure, so that the flow rate is established against any downstream pressure. Such a feed system is disclosed in patent application S.N. 687,020, filed Nov. 30, 1967 by Harry King entitled "Method and Apparatus for Controlled Pumping of Liquid Mercury." FIG. 2 illustrates a liquid metal column interface position detector wherein the flow through the column is maintained by the detector.

Feedline 82 has a supply column 84 of liquid metal therein which is supplied from controllable liquid metal supply 86. Supply column 84 has an interface with electrolyte 88 within feed tube 82. Positioned within the feedline, below electrolyte 88, is column 90 of liquid metal which serves as a supply to liquid metal arc cathode 92 within arc chamber 94.

Electrodes 96 and 98 are respectively positioned in supply column 84 and discharge column 90. Electrolysis current source 100 is connected to electrodes 96 and 98. Current source 100 supplies electrolysis current which plates the liquid metal through electrolyte 88 from supply column 84 to discharge column 90. Thus, the amount of liquid metal supplied to liquid metal arc cathode 92 is dependent entirely upon the amount plated across the electrolyte, in accordance with Faraday's Law, provided the interfaces between the electrolyte and the liquid metal are maintained in position. In the illustrated case, interface 102 is detected and serves for this purpose. However, either interface could be used for this purpose. furthermore, electrolysis current source 100 can be made adjustable so that different selected rates of the amount of liquid metal delivered can be obtained.

Induction coil 104 surrounds the feed tube at the desired position of interface 102. Induction coil 104 serves as part of a tank circuit, identically to induction coil 48. Thus, induction coil 104 is connected to an induction responsive circuit 106 which is identical to the circuit enclosed within dotted lines in FIG. 1. The induction responsive circuit is connected by signal lines 108 and 110 to the controllable liquid metal supply 86.

In the embodiment illustrated in FIG. 2, when interface 102 moves toward liquid metal arc cathode 92, such means that too much liquid metal is being fed to the arc cathode, for it is being moved in excess of the amount plated across electrolyte 88. Coil 104 senses the change in inductance by the lower position of interface 102, and induction responsive circuit 106 responds as is described above. Appropriate signals are transmitted by lines 108 and 110 to reduce the amount of liquid metal being supplied to feedline 82. Thus, interface 102 is maintained in position. By this means the liquid metal column interface position detector, in conjunction with the liquid feed means, provides for the proper flow of liquid metal to the point of use.

The liquid metal in both of the above described embodiments is a liquid metal suitable for the particular use at the point of use. In the illustrated case, the use is a liquid metal arc cathode, for such cathodes employ the liquid metal at a very low flow rate, and the means for determining the amount of liquid metal flow, that plated across the electrolyte by the electrolysis current, is primarily suitable for very low flow rates. Furthermore, for such arc cathodes the preferred liquid metal is mercury and another useful liquid metal is cesium. However, for other usages of the liquid metal, other liquid metals might preferably be employed, even if temperatures elevated above normal room temperatures are required.

A particular advantage of using inductive means for determining the position of an interface between liquid metal and another medium is principally its sensitivity. Inductive means does not have the disadvantage of immersed electrodes, and yet inductive means is able to accurately detect the extent the liquid metal extends into the induction coil and thus accurately detects the position of the interface. Furthermore, inductive detection can be employed through conductive, opaque tubes. This is not true of immersed electrodes which require an insulative feedline, or optical means which require a transparent feedline.

This invention having been described in its preferred embodiment, and an additional embodiment of the invention disclosed, it is clear that the invention is susceptible to numerous modifications and embodiments within the ability of those skilled in the art and without the exercise of the inventive faculty.

Accordingly, the scope of this invention is defined by the scope of the following claims.

What is claimed is:

1. Liquid metal feed means including a detector for detecting the position of an interface in a liquid metal column in a feedline, said detector comprising:
    an induction coil positioned adjacent said feedline at the desired liquid metal interface therein;
    inductance measuring means connected to said induction coil so that said inductance measuring means is responsive to the position of the liquid metal interface with respect to said induction coil;
    liquid metal control means connected to said feedline to control the position of the liquid metal interface within said feedline, said inductance measuring means being connected to said liquid metal control means to maintain the position of said interface substantially constant with respect to said induction coil.

2. The apparatus of claim 1 wherein said induction coil is connected into said inductance detection means as part of a resonant circuit therein, and said inductance detecting means signals said liquid metal interface position control means when the amplitude of said resonant circuit changes.

3. The apparatus of claim 2 wherein said resonant circuit includes said induction coil as part of a crystal controlled oscillator and the output of said crystal controlled oscillator is connected to said liquid metal interface positioned control means.

4. The apparatus of claim 3 wherein said output of said crystal controlled oscillator is connected to an amplifier and the amplifier output is connected to said liquid metal interface position control means.

5. The apparatus of claim 4 wherein said connection between said crystal controlled oscillator and said amplifier is a diode so that the output of said amplifier is unmodulated at resonant frequencies.

6. The apparatus of claim 1 wherein the interface with the liquid metal column in said feedline is with a liquid metal plating electrolyte.

7. The apparatus of claim 6 wherein electrodes are positioned with respect to said liquid metal and said electrolyte so that liquid metal is transported to said liquid metal side of said interface by plating through said electrolyte.

8. The apparatus of claim 7 wherein said controllable supply of liquid metal comprises a controllable, pressurized source of liquid connected to said feedline and separate electrodes and electrolysis current source are connected to plate liquid metal through said electrolyte.

9. The apparatus of claim 7 wherein said controllable supply of liquid metal comprises an electrolysis current source and electrodes connected to said electrolysis current source to plate liquid metal through said electrolyte in accordance with signals received from said liquid metal interface position detector induction coil.

References Cited

UNITED STATES PATENTS

| | | | |
|---|---|---|---|
| 1,001,589 | 8/1911 | Hatfield | 204—242 XR |
| 3,366,873 | 1/1968 | Miller et. al. | 324—40 |
| 3,397,715 | 8/1968 | Fathauer | 137—392 XR |
| 3,459,043 | 8/1969 | Young | 73—398 XR |

JOHN H. MACK, Primary Examiner

D. R. VALENTINE, Assistant Examiner

U.S. Cl. X.R.

137—392; 204—228; 324—34, 40, 59